United States Patent [19]

Sarauer

[11] Patent Number: 4,683,663
[45] Date of Patent: Aug. 4, 1987

[54] VEHICLE FRAME MEASUREMENT DEVICE

[76] Inventor: Alan J. Sarauer, 402 W. River St., Chippewa Falls, Wis. 54729

[21] Appl. No.: 864,815

[22] Filed: May 19, 1986

[51] Int. Cl.⁴ .................................................. G01B 5/25
[52] U.S. Cl. ......................................... 33/288; 33/138; 33/203.17; 33/600
[58] Field of Search .................. 33/288, 180 AT, 138, 33/169 R, 139, 170, 1 M, 503, 203.2, 203.12, 203.17

[56] References Cited

U.S. PATENT DOCUMENTS

| | | | |
|---|---|---|---|
| 2,914,857 | 12/1959 | Perwas | 33/170 |
| 4,200,988 | 5/1980 | Hunter | 33/203.2 |
| 4,294,016 | 10/1981 | Wilkerson | 33/138 R |
| 4,490,918 | 1/1985 | Clausen | 33/288 |

Primary Examiner—William D. Martin, Jr.
Attorney, Agent, or Firm—Allan O. Maki

[57] ABSTRACT

A frame straightening and measuring system for auto body repair is provided including position locating arms moveable along each of three axis, each of said arms being provided with an extendable retractable measuring device such as a roll-up type tape measure provided with means for clamping the free end thereof at a desired location on the extendable position locating bars whereby the correct position of a damaged part relative to the axis of the motor vehicle can be determined accurately.

4 Claims, 8 Drawing Figures

VEHICLE FRAME MEASUREMENT DEVICE

BACKGROUND OF THE INVENTION

The present invention relates to an improved motor vehicle frame and body measurement device used in the repair and straightening of damaged motor vehicles.

Various devices have been proposed to assist auto body workmen in measuring automotive bodies particularly those of the unibody construction after a collision. Generally the vehicles are elevated from the floor and rigidly secured to a straightening device so that forces may be applied to straighten damaged areas of the vehicle. Examples of systems which have heretofore been used include those shown in patent to Wendl, et al, U.S. Pat. No. 4,479,305, and U.S. Pat. No. 4,490,918 to Clausen. The present invention provides an improved measuring system usable with such frame straightening devices. Moreover, none of said references employ extendable-retractable measuring tapes of the type contemplated by the present invention.

It is an object of the present invention to provide an automotive frame and body measurement apparatus which incorporates a measuring system that is simpler, less expensive and quicker and easier to use than previous devices. A further object is to provide such device in which the measurements are easier to read than those employed in prior art devices. Another object of the invention is to provide a simplified system which utilizes conventional steel measuring tapes in conjunction with extendable position locating arms. Such tapes are incorporated into the measuring system as an integral part thereof. A further object is to provide a measuring system which is adjustable longitudinally of the axis of the automotive body as well as vertically and laterally in which the measurements can be easily read from the exterior of the vehicle or by a person standing or even lying below or along side the vehicle. A further object of the invention is to provide a measuring system wherein dual measurements can be read indicating at once, for example, the distance of a point from the center line of the vehicle as well as from another reference point to displace from the center of the vehicle. Another advantage is to provide a measuring system in which the starting point of the measurement can conveniently be set at zero at any desired point on the vehicle body.

The present invention relates to an improved automotive body measuring and aligning apparatus. The apparatus of this invention can be used independently of any other straightening device and is provided with clamps to hold the automobile in an elevated fixed position relative to the measuring device. The apparatus includes at least two elongated rails which are situated horizontally with their longitudinal axis parallel to the axis of the automobile being worked on. A vertical locator is provided so as to be moveable along the longitudinal rails and which may be set in position at any desired position along the length of the vehicle. A clamping means such as a set screw is provided to fix the vertical locators at desired positions. The locators are completely independent of each other so that points cam be located on one side of the vehicle at different locations front to back along the vehicle than on the other side.

In its simplest form, this invention contemplates the use of extendable position locating arms on each side of a damaged auto body, one extendable positioning arm being provided on each side of the vehicle to extend in each of three perpendicular (to each other) axes, there being affixed on each of said extendable arms at least one extendable-retractable tape measure each of which measures is provided with means to adjustably affix the free end thereof to a desired position on said positioning arm.

While the preferred embodiment of the invention have been described, it is understood that the invention is not limited to the details herein explained. It is expected that those skilled in the art will recognize numerous variations and equivalents which come within the spirit of the invention and which are intended to be included herein.

The invention will be more particularly described with reference to the following detailed description, appended claims and accompanying drawings wherein;

Figure 1:
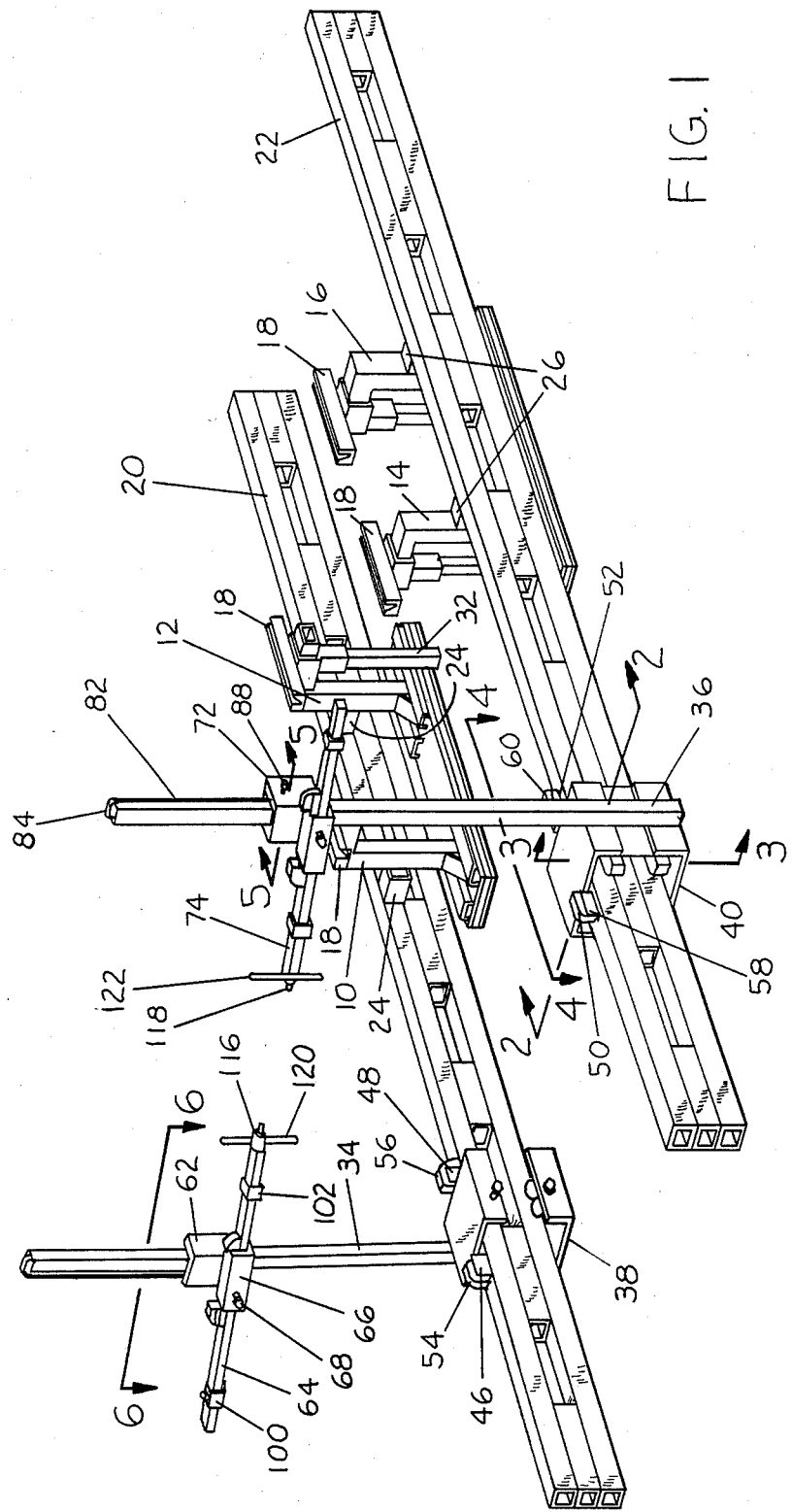
FIG. 1 is a perspective view of a measurement apparatus according to the present invention together with independent vehicle supporting devices used in connection therewith.
Figure 8:
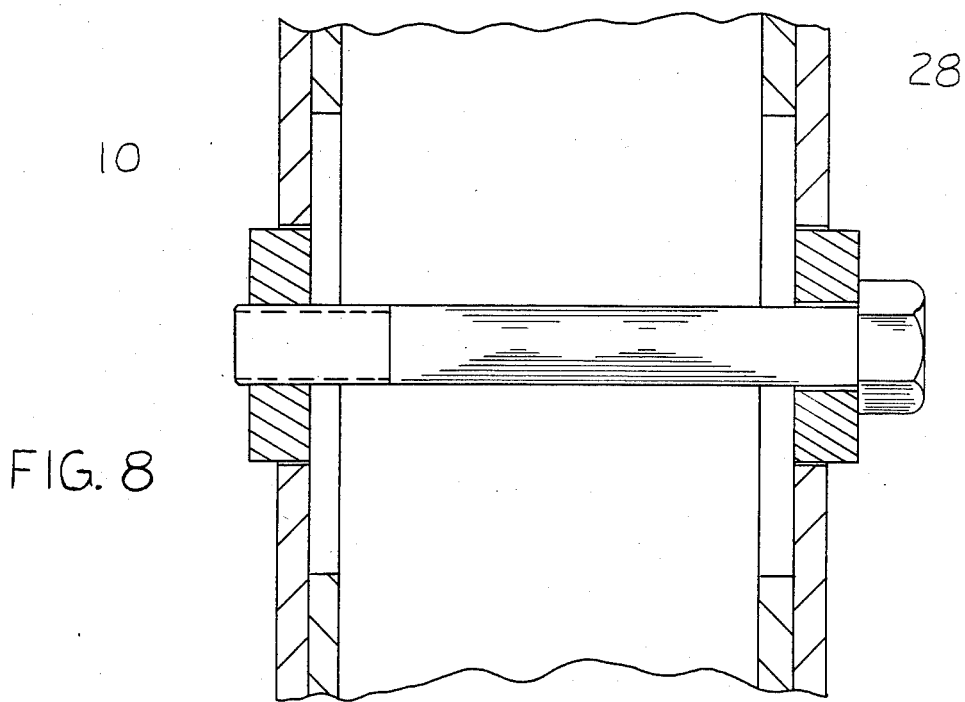
FIG. 8 is a cross-sectional view along line 8—8 of FIG. 7.

Referring more specifically to the drawings, there is seen in FIG. 1 two pairs of support ramps 10, 12 and 14, 16 spaced apart to support each side of a motor vehicle. These ramps support the vehicle by means of a clamp means 18 located at the top of each ramp. In addition to supporting the motor vehicle each pair of ramps or clamping towers adjustably support horizontal rails 20 and 22, the rails are supported on ramps 10 by means of adjustable mounting means 24 and 26. As seen in FIG. 8 the height of the ramps can be adjusted by loosening and tightening bolt 28 which is fitted through an elongated slot in the upper half of ramp 10. It will be noted that each clamp 18 can be adjustably positioned on the clamping tower by means of set screw 30. As seen, clamp 18 is supported on a sleeve 31 which is slidable over the horizontal end of tower 10. Attached to or inscribed on the top horizontal surface of tower 10 is a lineal measuring scale 11. Scale 11 is provided with scale markings which indicate the distance from the center or halfway point between the pair of towers 10 and 14 to any marked point on scale either in centimeters or inches. Proper location of the markings depends on accurate positioning of floor mounting places for the clamping towers 10, 12, 14 and 16. Once the scales have been thus properly positioned, the distance from the centerline will be indicated on scale 11. The clamps 18 can then be pre-positioned for any particular changed motor vehicle by setting the distance between clamps precisely in accordance with the motor vehicle manufacturer's specifications. Additional support is given to the ramps by means of adjustable extendable legs 32 which can be lowered to the floor and are useful in overcoming minior irregularities in the floor surface. By means of the various adjustments provided by the bolds and set screws as shown the motor vehicle and rails can readily be fixed in a level position.

Figure 2:
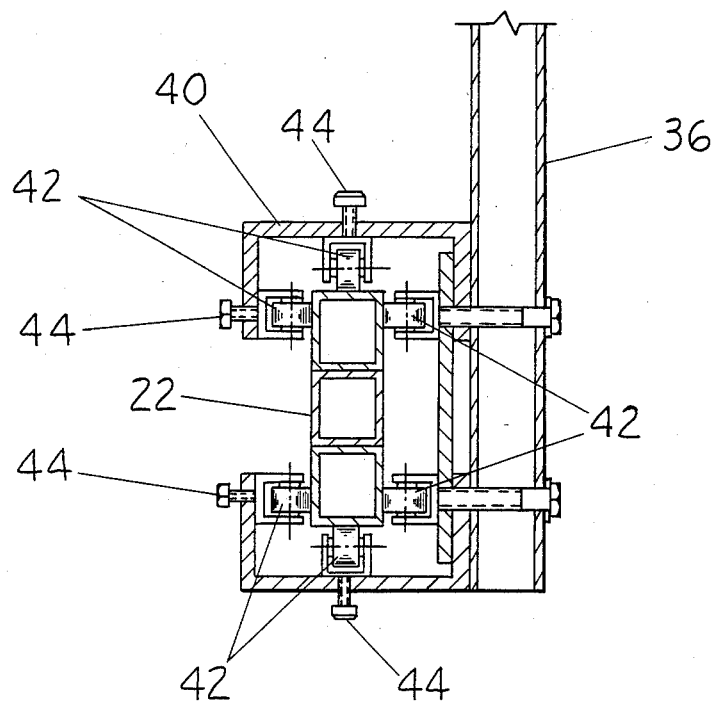
FIG. 2 is a cross-sectional view taken along line 2—2 of FIG. 1 with parts broken away.
Figure 3:
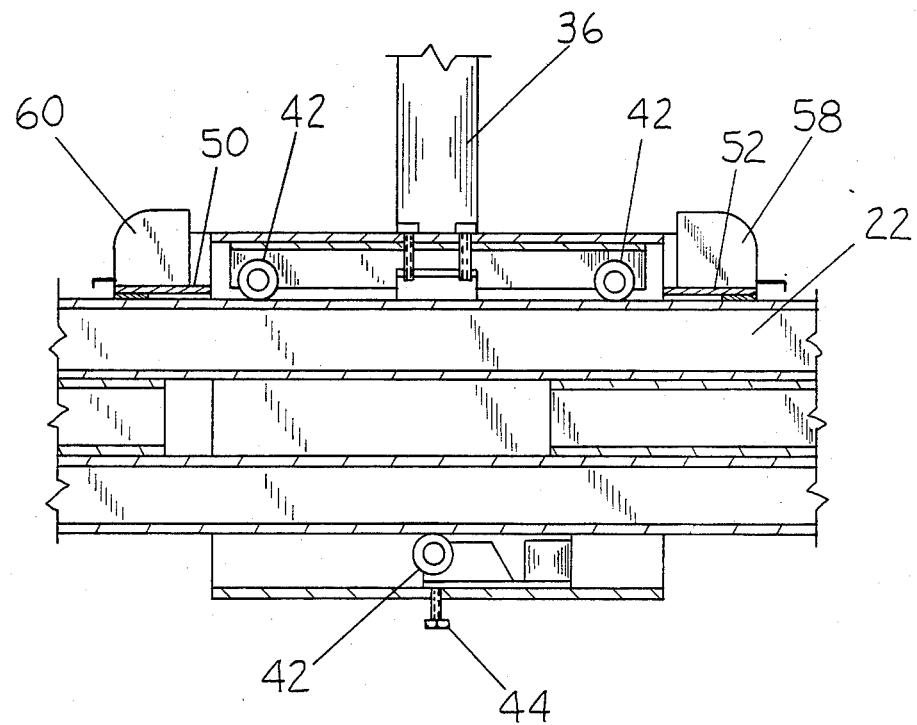
FIG. 3 is a cross-sectional view along line 3—3 of FIG. 1 with parts broken away.
Figure 5:
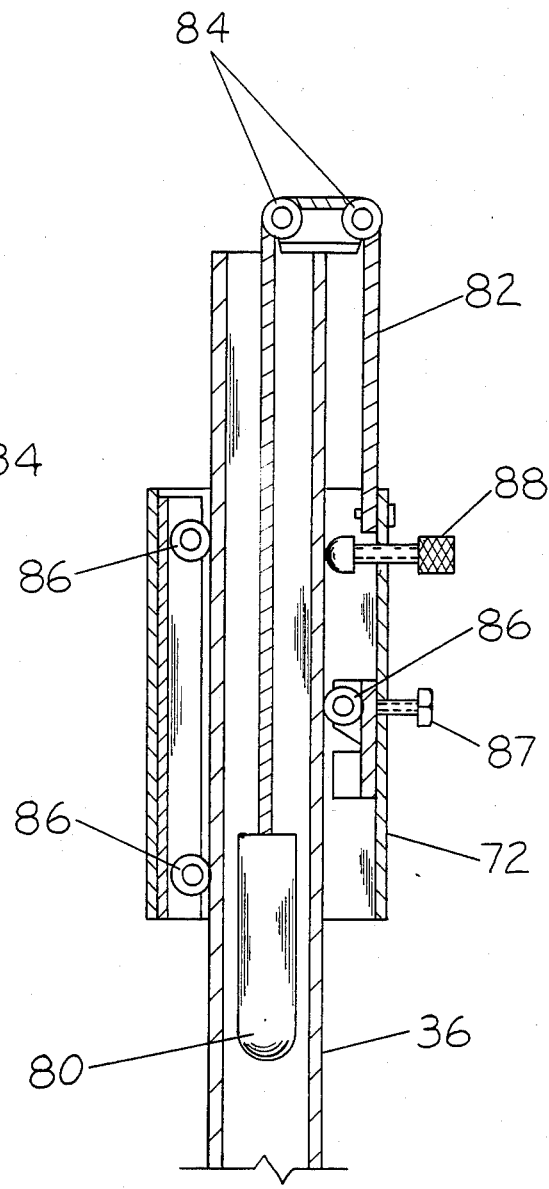
FIG. 5 is a cross-sectional view along line 5—5 of FIG. 1 with parts broken away.

A vertical upright member 34 and 36 are provided for each of the horizontal rails 20 and 22 as shown in FIG. 1. Rollers and bearings are provided as shown in FIG. 2 and FIG. 3 to facilitate the easy movement of the uprights over the rails. The vertical uprights or measuring towers can thus be easily rolled along the rails 20 and 22 to determine measurements on the desired part of the vehicle. As best seen in FIG. 2 upright member 36 is bolted to a generally rectangular housing 40 and upright 34 is similarly attached to housing 38. As seen in FIG. 2 rollers 42 are provided on each side of rail 22, said rollers being shown from the side in FIG. 3. It will be noted that set screws 4 are provided for each opposed pair of rollers so that the pressure of rollers 42 against the rail 22 and can be adjusted. Affixed to each side of housings 38 and 40 are brackets 46, 48 and 50, 52 which are adapted to hold retractable steel rulers or tapes 54, 56 and 58, 60, the operation of which will be more specifically set forth hereinafter. Slidably affixed over vertical upright 34 is a collar 62 to which is affixed a horizontal gauge member 64 which slidably passes through a horizontal collar 66 that is integral with collar 62. Set screw 68 is provided to secure the horizontal element 64 at a desired position. A similar collar 72 is provided around vertical element 36. For ease of positioning the elevation of collar 72 and horizontal element 74 slidably located in horizontal collar 78 is a counterweight 80 positioned within vertical element 36. As noted counter-weight 80 can be affixed to collar 72 by means of a rope 82 and allowed to move freely by passing over pulleys 84. Roller bearings 86 can also be provided within collar 72 to facilitate movement of the collar over element 36 as shown in FIG. 5. The elevation of collar 72 can be fixed by means of set screw 88 and tension on bearings 86 is adjusted by means of set screw 87.

Figure 4:
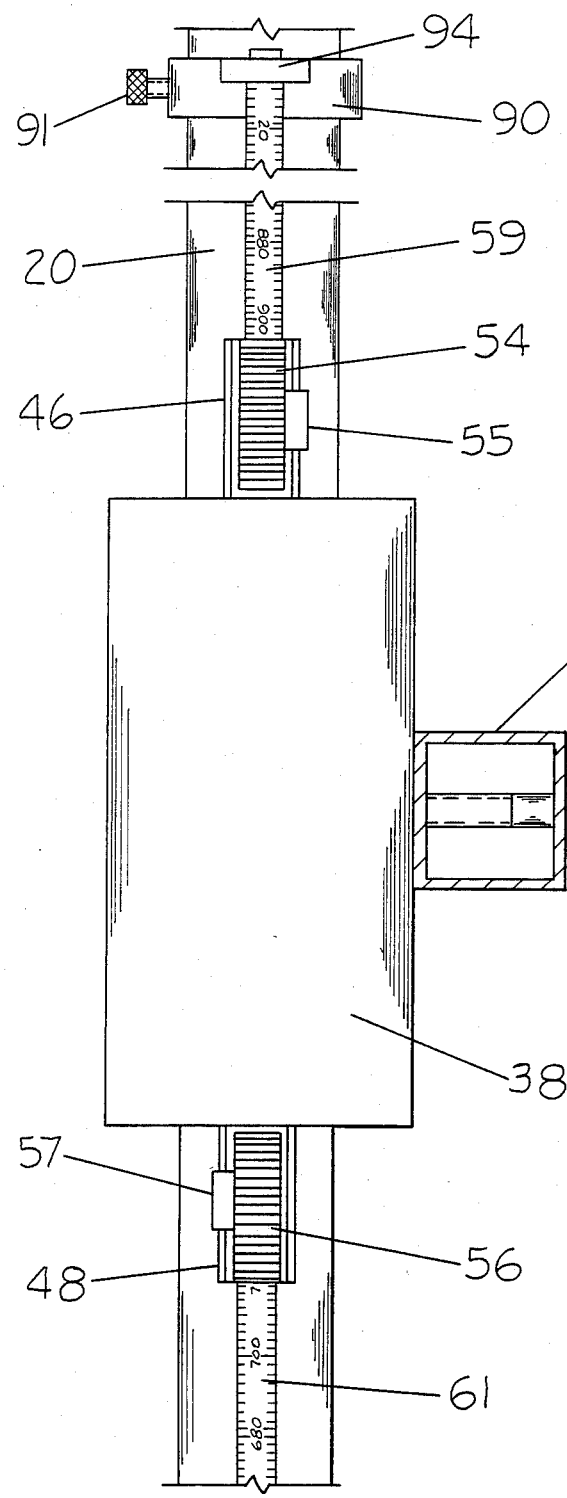
FIG. 4 is a cross-sectional view along line 4—4 of FIG. 1 with parts broken away.
Figure 4:
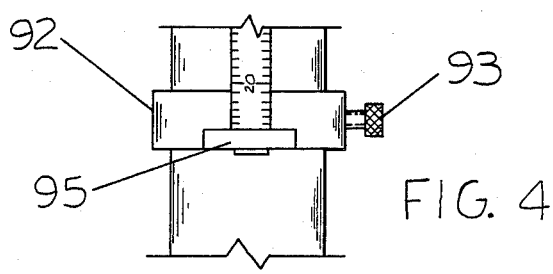

Referring specifically to FIG. 4 there is seen on each side of housing 38 brackets 46 and 48, respectively. Standard steel measuring tapes 54 and 56 are positioned inside of brackets 46 and 48 and secured thereto by means of a conventional spring clip 55 and 57, respectively, which spring clips are an integral part of extendable steel rule tapes commercially available. Adjustable collars 90 and 92 are provided to slide along rail 20 and may be clamped into any desired fixed position thereon be means of set screws 91 and 93, respectively. Suitable loops 94 and 95, respectively, are provided on collars 90 and 92 to receive the ends of steel measuring tapes 49 and 61 which are coiled inside of the tape casings 54 and 56 and may be extended therefrom in conventional fashion. It will be thus noted in FIG. 4 that if tape 59 were to be retracted and set screw 91 attached to rail 20 at such retracted position that housing 38 if moved to the right in FIG. 4 would cause steel tap 59 to draw out of casing 54. The amount of movement of housing 38 and thus vertical element 34 from the starting point can immediately be determined by reading the marked gauge on measuring tape 59. Similarly, the end of tape 61 can be set at any desired location using set screw 93. It will thus be readily apparent that the distance from various reference points can readily be determined as housing 38 is moved from right to left. The advantages of the measuring system of the present invention will thus be readily apparent to those skilled in the art. It will be notd that the same procedure and advantages inure from using steel tapes 50 and 52 in conjunction with viable box 40 which carries vertical member 36 along rail 22.

Figure 6:
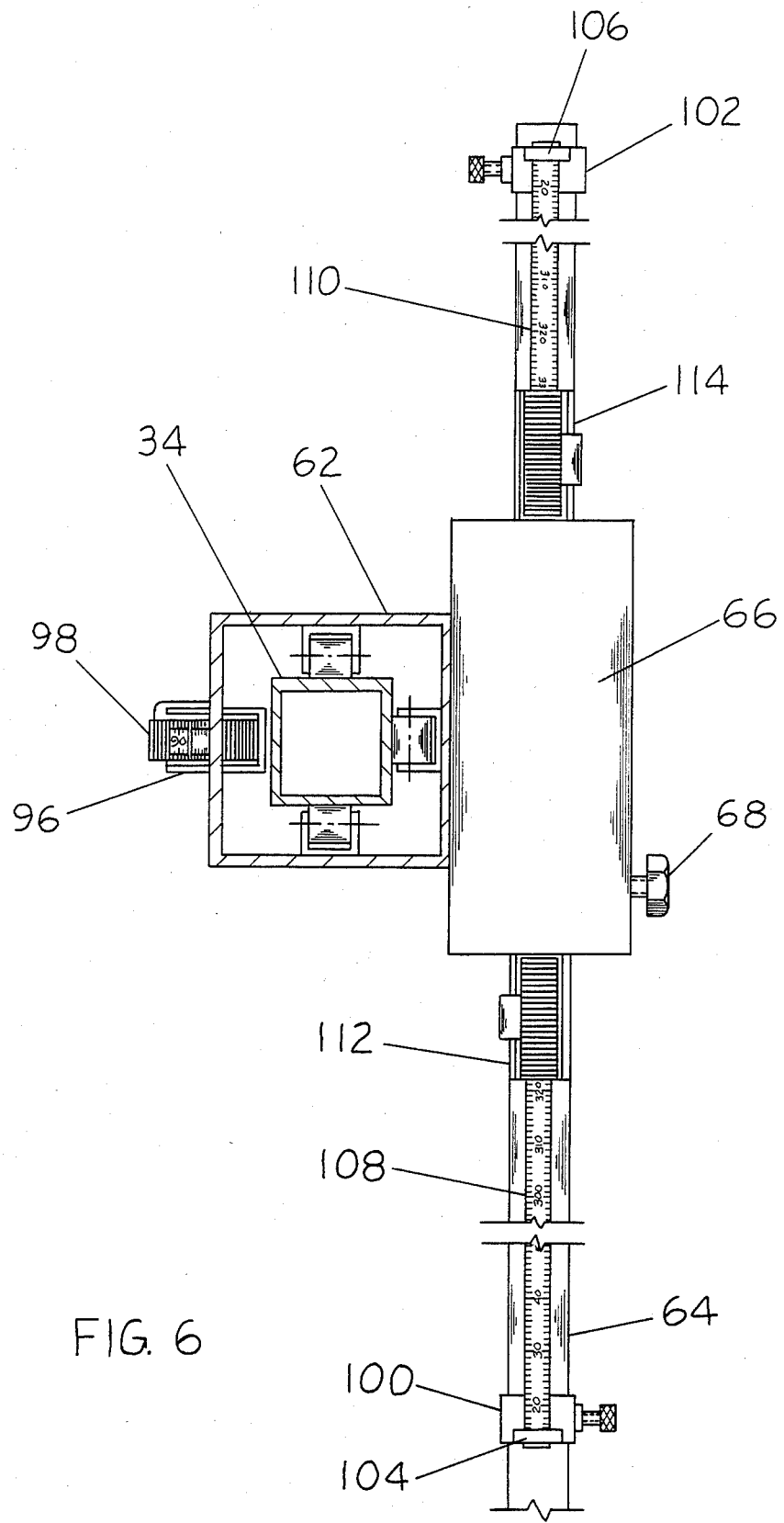
FIG. 6 is a cross-sectional view along line 6—6 of FIG. 1 with parts broken away.
Figure 7:
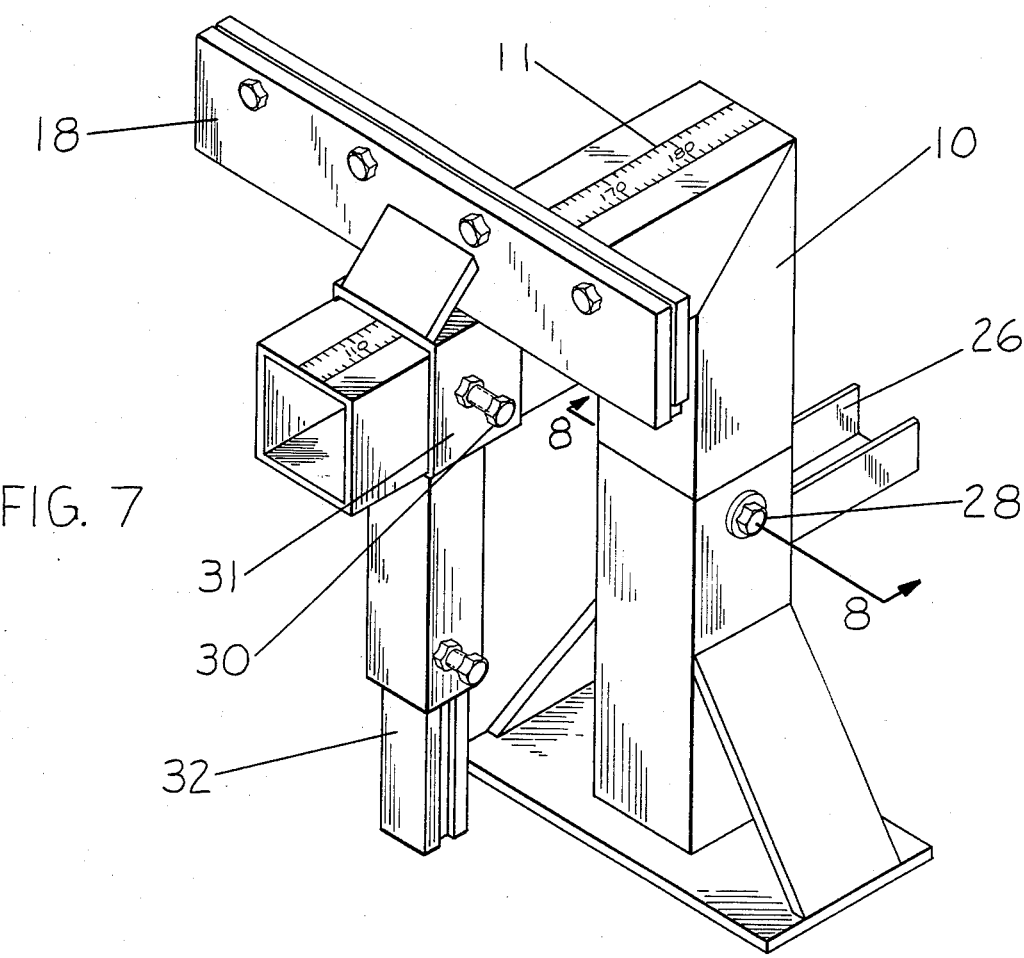
FIG. 7 is a perspective view of a vehicle clamping tower.

Referring to FIG. 6 it will be noted that collar 62 is provided with a bracket 96 which carries a steel tape 98 clipped to the bracket by means of the spring clip on the side of the steel measuring tape. The use of one or two such tapes on the vertical element will enable measurement of vertical distances starting from any desired beginning point. A collar (not shown) associated with vertical member 34 is used to adjustably affix the end of tape 98 to a desired point on vertical member 34.

Collars 100 and 102 are provided to slidably fit over or around horizontal member 64 and are provided with means 104 and 106 adapted to receive the free ends of extendable steel rulers 108 and 110 which are situated in brackets 112 and 114 by means of clips on the side of the steel tape housing. It will be noted that in the preferred embodiment the end portions 116 and 118 of the horizontal measuring bars may be extendable and are provided with pointers as indicated. Pointers 120 and 122 may be used to more precisely locate points under a vehicle or in the interior thereof. An advantage of the present invention is that the measuring devices on one side of a motor vehicle which has not been damaged can be measured and set using the measuring device of the present invention. Measurements can thereafter be made on the damaged side to determine proper location from which the damaged parts have been displaced. The positions thus determined can be used as a guide as the vehicle is straightened using conventional pulling devices. It will be apparent to those skilled in the art that various commerically available devices can be used by those skilled in the art.

While specific embodiments of the invention have been described, it is to be understood that the invention is not limited to the specific details herein explained. It is expected that those skilled in the art having been provided with the teachings herein will recognize numerous equivalents and variations which will come within the spirit of the invention which are intended to be included herein.

What is claimed is:

1. A vehicle frame and body measurement apparatus for use in realigning the structure of a damaged unibody vehicle the device having a longitudinal axis utilized in a horizontal plane, the apparatus comprising means for measuring the vehicle body and frame comprising,
    (a) means for supporting a damaged motor vehicle in a fixed position,
    (b) an elongated rail on each side of said supporting means spaced apart a distance greater than the width of said supporting means and the width of said vehicle,
    (c) a vertical upright of a length exceeding the height of said motor vehicle slidably supported by each of said rails and having a vertical axis substantially perpendicular to the horizontal plane of the vehicle,
    (d) a vertically adjustable horizontal bar attached to each of the uprights, substantially perpendicular to both the longitudinal axis of the rails and the vertical axis of the uprights,
    (e) means for affixing the horizontal bar to the uprights so that the bar is vertically adjustable, said affixing means being provided with releasable means to permit adjustable horizontal extension of said horizontal bar, (f) at least one extendable measuring means attached to each vertical upright at its junction with its associated horizontal rail and adjustably extending along said horizontal rail, the free end of said measuring means having means to releasably affix it to said rail, (g) at least one extendable measuring means attached to each horizontal bar at its junction with its associated vertical upright and adjustably extending along said vertical upright, the free end of said measuring means having means to releasably affix it to said upright, (h) at least one extendable measuring means attached to each affixing means, (e), adjustably extending along said horizontal bar, the free end of said measuring means having means to releasably affix it to said horizontal bar, and (i) a locator attached to the end of each horizontal bar.

2. Apparatus according to claim 1 wherein, (a) a linear measuring scale is provided on a stationary horizontal surface of said adjustable clamping means, said scale being preset to indicate the distance from the centerline of said apparatus to each indicated point on said scale, and (b) said adjustable means comprising a sleeve which is slidably fitted around said stationary horizontal surface and (c) means to fix said sleeve at a desired location on said surface.

3. Apparatus according to claim 1 wherein each of said measuring means comprises a roll-up type steel tape measure.

4. Apparatus according to claim 2 wherein said sleeve is provided on its bottom surface with an adjustable extendable supporting arm.

* * * * *